No. 650,406. Patented May 29, 1900.
W. MACK.
COMBINED AUTOMATIC FENDER AND BRAKE FOR TRAM CARS, &c.
(Application filed Dec. 2, 1899.)

(No Model.) 2 Sheets—Sheet 1.

Wittnesses: Inventor:

No. 650,406. Patented May 29, 1900.
W. MACK.
COMBINED AUTOMATIC FENDER AND BRAKE FOR TRAM CARS, &c.
(Application filed Dec. 2, 1899.)
(No Model.) 2 Sheets—Sheet 2.

UNITED STATES PATENT OFFICE.

WILHELM MACK, OF HANOVER, GERMANY.

COMBINED AUTOMATIC FENDER AND BRAKE FOR TRAM-CARS, &c.

SPECIFICATION forming part of Letters Patent No. 650,406, dated May 29, 1900.

Application filed December 2, 1899. Serial No. 739,064. (No model.)

*To all whom it may concern:*

Be it known that I, WILHELM MACK, engineer, a subject of the King of Prussia, German Emperor, residing at No. 54 Dessauerstrasse, Hanover, Germany, have invented new and useful Improvements in a Combined Automatic Fender and Brake for Tram-Cars and the Like, of which the following is a specification.

The present invention relates to an improved combined automatic fender and brake for tram-cars and the like, the purpose of the invention being to so construct this kind of device that as soon as the progress of the car is obstructed the brake automatically acts, thus preventing a person or the obstructing article from being run over.

With this end in view the invention consists in the details of construction and combination of elements hereinafter set forth and then specifically designated by the claims.

In order that those skilled in the art to which this invention appertains may understand how to make and use the same, its construction and operation will now be described in detail, referring to the accompanying drawings, forming a part of this specification, in which—

Figure 1:
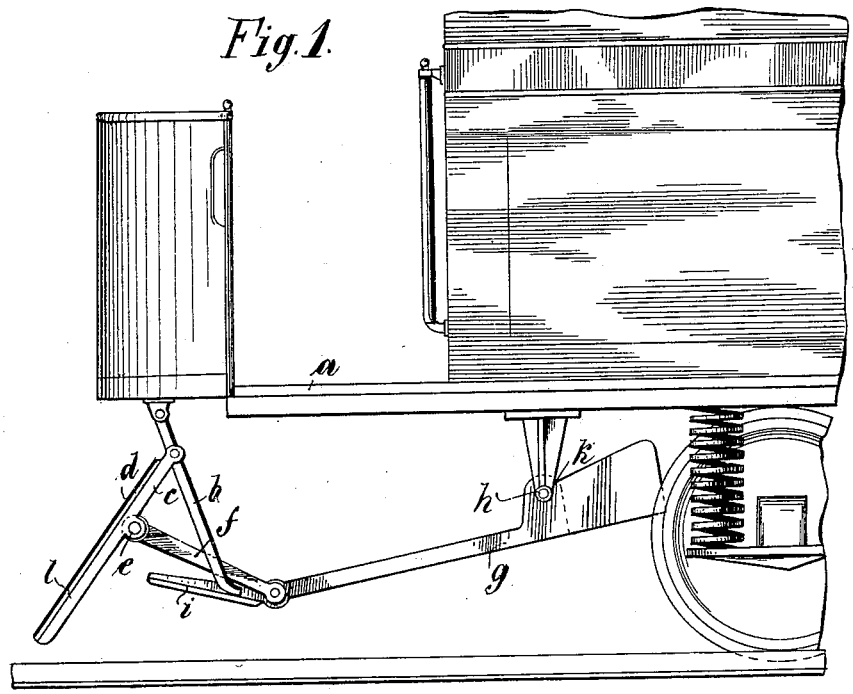
Figure 2:
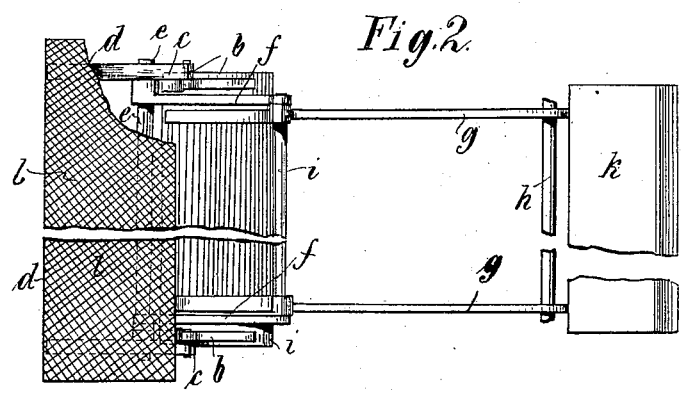
Figure 3:
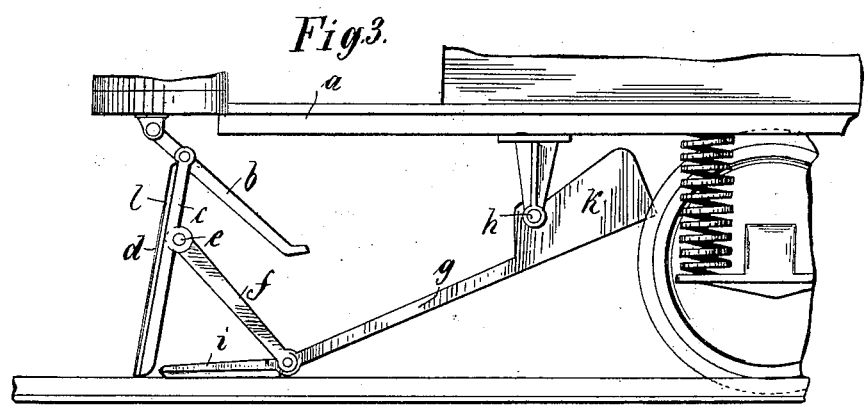

Figure 1 is an elevation of a portion of a car, showing the fender and brake in their elevated or inactive position. Fig. 2 is a plan view of the fender and brake; and Fig. 3 is an elevation of a portion of a car, showing the fender and brake in their active position.

In carrying out my invention as here embodied I pivot to the under side of the platform $a$ of the car two arms $b\,b$. Pivoted to these arms are the supporting-rails $c\,c$ for the fender-frame $d$. These rails are transversely connected by a metal rod $e$, which latter carries at either end a connecting-bar $f$, the other ends of these connecting-bars $f$ being pivoted to the brake-levers $g$.

The brake-levers $g$ are mounted on a rod $h$, journaled in brackets secured to the under side of the car, just in front of the wheels, in such a manner that their shorter extremities point toward the wheels. A weighted crossbeam $k$ connects the two shorter extremities. The longer extremities carry the brake $i$.

The fender-frame $d$ may be fitted up so as to offer a soft or yielding surface to the obstructing object, an elastic cover $l$ preferably serving for the purpose, which may be made of any well-known and suitable material.

The operation of the device is as follows: The fender, slightly protruding beyond the end of the car and located a short distance above the road-surface, coming in contact with an obstruction, the frame $d$ will be pressed back, thereby causing the connecting-bars $f$, mounted on the rod $e$, in connection with the fender-rails $c$, to move backward, and consequently to press downward the brake-levers $g$ and to apply the brake $i$ to the rails. The brake remains in action until the obstruction is removed from the fender, when the parts will return to their original position by virtue of the weighted beam $k$ on the shorter extremity of the brake-levers, the weight of which beam $k$ is so chosen that it will normally hold the brake and fender above the road-surface.

Having now particularly described my invention, what I claim as new, and desire to secure by Letters Patent, is—

1. In an automatic car-fender the combination of brake-arms pivoted to the under side of the platform of the car, the fender-frame pivotally carried by said arms near the pivots, connecting-rods pivoted to the side rails of the fender-frame and to the brake-levers, brake-levers pivotally mounted at the under side of the car, braking means fitted to the front extremities of the brake-levers, the rear extremities being provided with a counterpoise, so as to normally hold fender and brake above the road-surface, substantially as set forth.

2. The herein-described combination of the arms $b$ pivoted beneath the car, fender-frame $d$ pivoted near the top end of said arms so as to be located outside same, brake-levers $g$ mounted on a transverse rod $h$ journaled in brackets at the under side of the car, counterpoise $k$ at the shorter extremities of the braking-levers, normally holding the brake and fender above the road-surface braking means $i$ at the longer extremities, and connecting-rods $f$ pivoted to the front ends of the braking-levers and to a rod $e$ connecting the side rails of the fender-frame insuring the brake to be applied on pressure against the fender, substantially as and for the purpose set forth.

In testimony whereof I have hereunto set my hand in presence of two subscribing witnesses.

WILHELM MACK.

Witnesses:
LEONORE KASCH,
KIRKE LATHROP.